UNITED STATES PATENT OFFICE.

FLOYD J. METZGER, OF NEW YORK, N. Y., ASSIGNOR TO AIR REDUCTION COMPANY, OF NEW YORK, N. Y., A CORPORATION OF NEW YORK.

METHOD OF MANUFACTURING ALKALI-METAL CYANID AND SEPARATING THE SAME FROM ALKALI-METAL HYDROXID.

1,295,049.      Specification of Letters Patent.      Patented Feb. 18, 1919.

No Drawing.      Application filed July 25, 1917. Serial No. 182,643.

*To all whom it may concern:*

Be it known that I, FLOYD J. METZGER, a citizen of the United States, residing in the city of New York, State of New York, have invented certain new and useful Improvements in Methods of Manufacturing Alkali-Metal Cyanid and Separating the Same from Alkali-Metal Hydroxid, of which the following is a specification.

In the manufacture of alkali metal cyanid by processes which involve the treatment of a mixture of carbonaceous material and an alkali metal carbonate in the presence of nitrogen or a nitrogen-containing gas in a manner to cause the necessary reactions between the nitrogen and other ingredients of the mixture to produce the cyanid it is usually the case that the resulting product includes or contains alkali metal oxid or hydroxid formed therefrom in addition to the alkali metal cyanid and carbonate.

The treatment to which the mixture is usually subjected to effect the reactions referred to consists in the application of heat to the mixture in the presence of nitrogen or a nitrogen-containing gas in a furnace to raise the temperature thereof to a point sufficiently high to cause the necessary reactions.

The carbonaceous material employed may consist of coke, charcoal or a mixture of these or of any other suitable carbonaceous material. The carbonate employed usually is sodium carbonate, although other alkali metal carbonates as potassium, barium, etc., may be employed.

The solubility of the alkali metal hydroxid which is formed from the oxid contained in the product which is discharged from the furnace after treatment, as above described, is approximately the same as that of the alkali metal cyanid the production of which is desired; consequently unless some means or way be adopted or devised to prevent it the alkali metal hydroxid will be present with the cyanid and constitute a contamination of the desired finished product, viz. alkali metal cyanid.

It is the object of my invention to provide a method of treatment of the product discharged from the furnace after treatment as above described whereby the alkali metal cyanid may be separated from the mixture, constituting such product, free from alkali metal hydroxid.

After the mixture of ingredients, as above stated, has been treated in the presence of or while in an atmosphere of nitrogen or nitrogen-containing gases, as above set forth, in a manner to cause the necessary reactions between the nitrogen and the ingredients of the mixture to produce the alkali metal cyanid and incidentally alkali metal oxid the resulting product preferably is treated with water to convert the anhydrous carbonate present to the deca-hydrate form, the oxid being at the same time changed to hydroxid. The mixture or product is then subjected to the dissolving action of a dissolving agent or "treating solution" such as is described in my copending application filed July 25, 1917, Serial No. 182642, the said agent or "treating solution" consisting of water to which has been added an organic solvent soluble in water. This organic solvent may consist of an organic liquid miscible with water as, for example, ethyl alcohol, methyl alcohol, denatured alcohol, acetone and other like organic solvents.

Any alkali hydroxid which may be present in the mixture has approximately the same solubility as the alkali metal cyanid. Therefore, it is apparent that the resulting solution will include or contain not only the alkali metal cyanid but also the alkali metal hydroxid in solution. The presence of the alkali metal hydroxid in solution is objectionable, constituting impurity in or a contamination of the alkali metal cyanid which is the product desired.

In order to remove the alkali metal hydroxid I subject the mixture which has been formed by the addition of the dissolving agent or "treating solution" to the action of carbon dioxid, preferably under pressure slightly greater than normal atmospheric pressure, in order to convert the alkali metal hydroxid into carbonate. The latter being comparatively or relatively insoluble in the dissolving agent or "treating solution" it precipitates out in the form of deca-hydrate, thereby giving a liquor free of any alkali metal hydroxid. In treating the mixture with carbon dioxid care should be taken to avoid too great an excess of dioxid in order to prevent decomposition of the alkali metal cyanid.

One way of carrying out the process constituting my invention may be described specifically as follows:

The furnaced product, such as above described, is first treated with the necessary amount of water to convert the anhydrous carbonate present into the deca-hydrate form, the alkali metal oxid being at the same time converted into hydroxid; then the dissolving agent or "treating solution" is added and when the action is complete the whole resultant mass is subjected to carbon dioxid under slightly increased pressure to convert the alkali metal hydroxid into carbonate which, as above stated, is comparatively or relatively insoluble in the dissolving agent or "treating solution" and consequently precipitates out in the form of decahydrate. The mass is then cooled and filtered to separate the solution containing the alkali metal cyanid. The filtrate is then evaporated, to remove the solvent and leave the cyanid in a dry state. For purposes of economy the organic solvent should be collected in a suitable condensing apparatus in order that it may be reused in subsequent operations.

I claim:—

1. The method of manufacturing alkali metal cyanid which consists in mixing together carbonaceous material and an alkali metal carbonate and supplying nitrogen or a nitrogen-containing gas to the said mixture and causing reactions between the nitrogen and the ingredients of the said mixture to form a product including alkali metal cyanid, alkali metal oxid and an alkali metal carbonate, treating the mixture thus produced with a dissolving agent in which the alkali metal carbonate is comparatively insoluble which dissolves the cyanid and the hydroxid formed from the oxid and thereafter treating the resultant mass with carbon dioxid to convert the hydroxid into carbonate thereby precipitating the same from the said solution and then separating the liquid portion of the mixture from the undissolved portions thereof, substantially as described.

2. The method of manufacturing alkali metal cyanid which consists in mixing together carbonaceous material, an alkali metal carbonate and supplying a nitrogen gas or a nitrogen-containing gas to the said mixture and applying heat to the same to cause the reactions necessary to form alkali metal cyanid and incidentally alkali metal oxid, treating the mixture thus formed with a dissolving agent in which the alkali metal carbonate is comparatively insoluble for dissolving out of the alkali metal cyanid and any alkali metal hydroxid formed from the oxid which may be present, treating the resultant mass with carbon dioxid to convert the hydroxid into carbonate, thereby precipitating the same from the said solution, separating the liquid portion of the mass from the undissolved portions thereof, and thereafter removing the dissolving agent from the filtrate.

3. The method of manufacturing alkali metal cyanid which comprises the mixing together of carbonaceous material, an alkali metal carbonate and supplying a nitrogen gas or a nitrogen-containing gas to the mixture and causing the necessary reactions to form alkali metal cyanid, treating the mixture thus formed with a solvent to dissolve the alkali metal cyanid to the exclusion practically of the carbonate and unacted upon portion of the mixture, thereafter subjecting the resultant product to the action of carbon dioxid under increased pressure to convert the hydroxid into carbonate, which latter is comparatively insoluble in the solvent employed and therefore separates out and thereafter separating the portions of the said mass in solution from the undissolved portions thereof, substantially as described.

4. The method of manufacturing alkali metal cyanid, which consists in mixing together carbonaceous material and a suitable alkali metal and thereafter subjecting the mixture to heat in the presence of nitrogen or a nitrogen-containing gas to effect the necessary reactions to form a product comprising alkali metal cyanid and alkali metal oxid, treating the mass thus produced with a solvent to dissolve the alkali metal cyanid and alkali metal hydroxid formed from the oxid, alkali metal carbonate being comparatively insoluble therein, subjecting the resultant mass to the action of carbon dioxid under pressure to convert the alkali metal hydroxid into a carbonate of deca-hydrate form, thereby precipitating the same from the solution and thereafter filtering to separate the liquid portion of the mass from the solid portions thereof, and removing the solvent from the filtrate to leave alkali metal cyanid.

5. The method of manufacturing alkali metal cyanid which consists in mixing together carbonaceous material, an alkali metal carbonate and placing the same in a furnace and supplying nitrogen or a nitrogen-containing gas to the said mixture in the furnace and subjecting the said mixture in the presence of such nitrogen to the action of heat to cause the necessary reactions between the nitrogen and other ingredients of the mixture to produce alkali metal cyanid, thereafter treating the mixture as discharged from the furnace with water to convert the anhydrous carbonate present to deca-hydrate form, treating the mass thus produced with a solvent which will dissolve the alkali metal cyanid and any alkali metal hydroxid which may be present to the exclusion practically of the carbonate which may be present in deca-hydrate form, treating the mass with carbon dioxid to convert any alkali metal hydroxid which may be present into an alkali metal carbonate of deca-hydrate form and thereby effecting its precipitation from the solution, thereafter separating the liquid portion of the mass from the undissolved or solid portions thereof and evaporating the filtrate to remove the solvent therefrom.

6. The method of separating alkali metal hydroxid from a mixture of alkali metal cyanid and such hydroxid which consists in treating the said mixture with a solvent capable of dissolving both the cyanid and hydroxid and in which alkali metal carbonates are comparatively insoluble then treating the resulting solution with carbon dioxid to convert the hydroxid into carbonate and thereafter removing the precipitate from the mass.

7. The method of separating alkali metal hydroxid from a mixture of alkali cyanid and alkali metal hydroxid which consists in treating the said mixture with a solvent capable of dissolving both the cyanid and hydroxid and in which alkali metal carbonates are comparatively insoluble, then treating the resulting solution with carbon dioxid under pressure slightly in excess of atmospheric pressure to convert the said hydroxid into a carbonate of deca-hydrate form which separates out in the form of a precipitate and thereafter filtering to separate the said precipitate from the said solution.

8. The method of separating alkali metal cyanid from a mixture containing the said cyanid, a carbonate in deca-hydrate form and alkali metal hydroxid which consists in treating the said mixture with a solvent in which the alkali metal carbonate is comparatively insoluble which dissolves the said cyanid and the said hydroxid to the exclusion practically of the carbonate and thereafter treating the resultant mass with carbon dioxid under a slight increase of pressure to convert the said hydroxid into a carbonate also of deca-hydrate form, and thereafter separating the liquid from the solid portions of the resultant mass, substantially as described.

9. The method of separating alkali metal cyanid from a mixture of the same with alkali metal hydroxid which consists in treating the said mixture with a solvent capable of dissolving both the cyanid and hydroxid and in which alkali metal carbonates are comparatively insoluble, then treating the resulting solution with carbon dioxid under a pressure slightly in excess of normal atmospheric pressure to convert the hydroxid into a carbonate of deca-hydrate form, the latter separating out as a precipitate and thereafter filtering to separate the said precipitate from the solution and thereafter evaporating the filtrate to remove the solvent and leave the cyanid.

10. The method of recovering alkali metal cyanid from furnace products containing the same together with alkali metal hydroxid, which comprises extracting the furnace product with a solvent in which the alkali metal cyanid and hydroxid are soluble but in which alkali metal carbonate is relatively insoluble, carbonating the resulting solution and thereby precipitating alkali metal carbonate therefrom and separating the precipitated carbonate from the solution, substantially as described.

11. The method of recovering alkali metal cyanid from furnace products containing the same together with alkali metal hydroxid and alkali metal carbonate, which comprises extracting the furnace product with a solvent in which the alkali metal cyanid and hydroxid are soluble but in which the alkali metal carbonate is relatively insoluble and thereby recovering the alkali metal cyanid and hydroxid in solution, carbonating the resulting solution and thereby precipitating the alkali metal carbonate therefrom and separating the precipitated carbonate from the solution, substantially as described.

12. The method of recovering alkali metal cyanid from furnace products containing the same together with alkali metal hydroxid, which comprises extracting the furnace product with a solvent, comprising water and an organic solvent soluble therein, in which the alkali metal cyanid and hydroxid are soluble but in which the alkali metal carbonate is relatively insoluble, carbonating the resulting solution and thereby precipitating the alkali metal carbonate therefrom and separating the precipitated carbonate from the solution, substantially as described.

In testimony that I claim the foregoing as my invention I have hereunto signed my name this 23rd day of July, A. D. 1917.

FLOYD J. METZGER.